Figure 2:
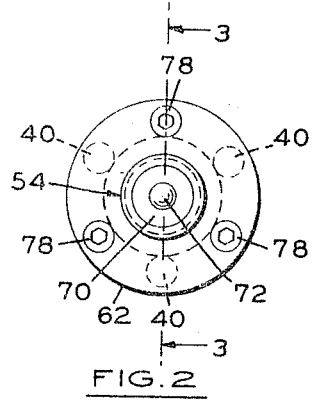

May 23, 1967  R. C. ENGLE  3,320,672
ELECTRONIC GAGE

Filed March 3, 1965  2 Sheets-Sheet 1

INVENTOR.
ROBERT C. ENGLE
BY
Bower & Patalidis
ATTORNEYS

May 23, 1967  R. C. ENGLE  3,320,672
ELECTRONIC GAGE

Filed March 3, 1965  2 Sheets-Sheet 2

INVENTOR.
ROBERT C. ENGLE
BY
Bower & Patalidis
ATTORNEYS

United States Patent Office 3,320,672
Patented May 23, 1967

3,320,672
ELECTRONIC GAGE
Robert C. Engle, Livonia, Mich., assignor to
Micromatic Hone Corporation
Filed Mar. 3, 1965, Ser. No. 436,850
2 Claims. (Cl. 33—172)

The present invention relates to measuring systems, and more particularly to an electronic gage head for such systems, wherein a measurement of a physical characteristic of a workpiece is obtained. This is determined by measuring the value of an impedance. In the specific form disclosed herein, the invention is particularly adapted for electrical gaging physical dimensions of the workpieces and affords an economical and reliable unit for detecting variations in physical dimensions of magnitudes as low as one-millionth of an inch. This application is directed toward an improvement of the gaging apparatus shown in the U.S. patents to M. M. Arlin, Nos. 2,635,748 and 2,908,980, and can be used with the electrical circuitry shown therein.

It is a general object of this invention to provide a transducer of an improved construction for providing an electrical output signal varying in magnitude in accordance with variations in input signal.

It is another object of this invention to provide a transducer having novel means for responding to variations in physical dimensions of a workpiece.

It is still another object of this invention to provide a transducer having novel means for providing adjustment and/or calibration of the output signal.

Figure 1:
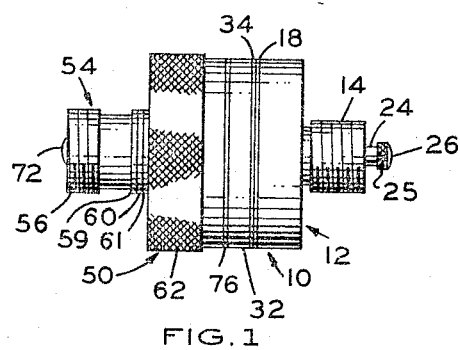
Figure 3:
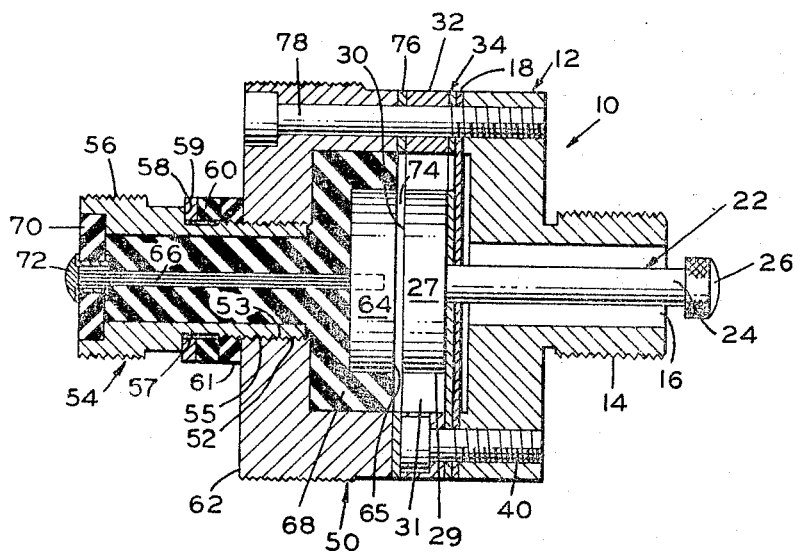
Figure 4:
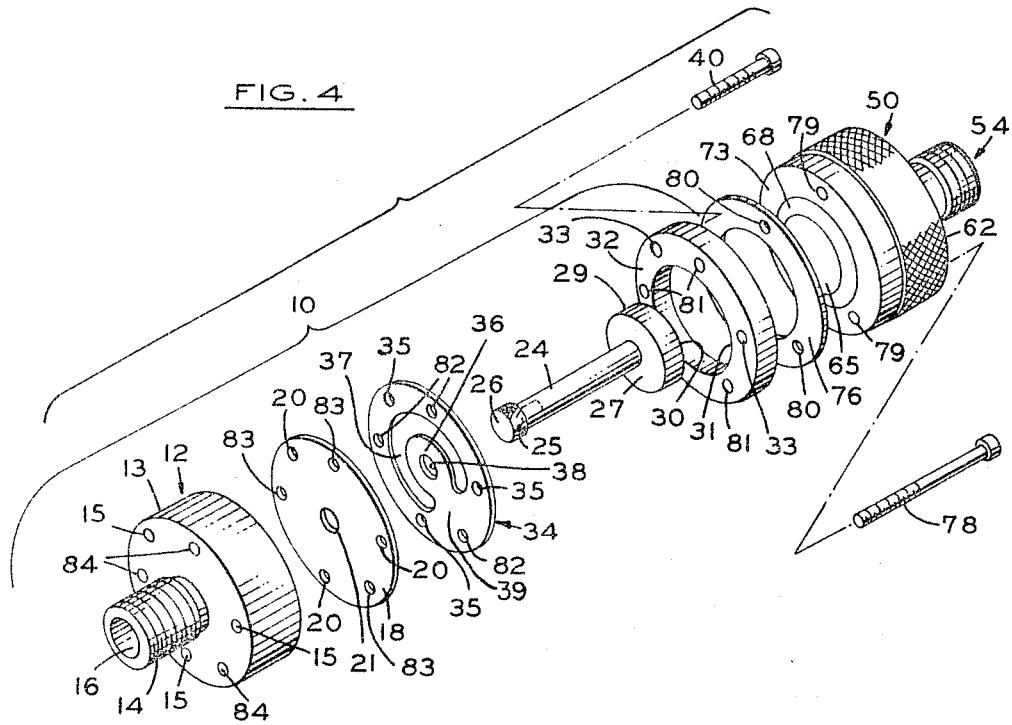
Figure 5:
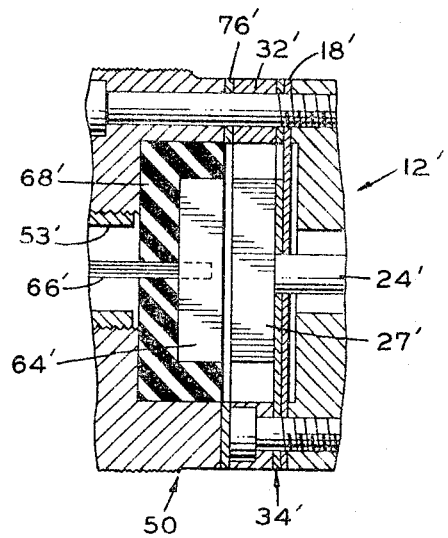

The principal objects of the present invention are: to provide a new and improved gage head which is simple in arrangement, economical for manufacture and assembly, accurate and reliable in operation; to provide an improved gaging head which cooperates in a desired manner with the electrical network to provide a rectilinear output response of the network; and to generally improve the construction and arrangement of the above generally indicated apparatus. With the above as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

FIG. 1 is a plan view of the electronic gage head,
FIG. 2 is an end view of the electronic gage head,
FIG. 3 is a view in section, taken along line 3—3 of FIG. 2,
FIG. 4 is an exploded view taken in isometric projection of the electronic gage head, and
FIG. 5 is a modification of the gage poles.

Referring first to FIG. 1, the electronic gage head is divided into two sub-assembly portions, namely an electronic gage head sub-assembly 10 and a pole-piece sub-assembly 50. The electronic gage head sub-assembly 10 comprises a gage mounting plate 12 at one end which has a larger portion 13 and narrow threaded end portion 14 adapted to be threaded into a gaging fixture (not shown). An axial bore 16 extends throughout its length to accommodate a gage plunger 22. In addition the gage mounting plate 12 has three mounting holes or cap screw opening 15.

The gage plunger 22 includes a shaft 24 with a gage tip 25 having a rounded end portion 26 adapted to contact a surface to be gaged. The action of a round gage tip does not exclude the use of a flat end portion, the piece being one of adaptability to the workpiece. However, the preferred embodiment is directed to a rounded gage tip portion. The shaft is adapted to be inserted axially through the bore 16 of mounting plate 12. The other end of gage plunger 22 has a round gage pole 27 adapted to be secured to the end of the plunger. The gage pole 27 in this preferred embodiment is round, however, it does not exclude the use of a square or rectangular gage pole, see FIG. 5. The preferred embodiment has a round gage pole having a specific configuration of larger diameter 29 which is adapted to be spaced in axial bore 31 of gage pole spacer 32. Gage pole spacer 32 has cap screw openings 33 equidistant near the circumferential edge, the preferred embodiment showing that it is not limited to the number of securing cap screws or the spacing thereof.

A gasket 18 having cap screw openings 20 equidistant has an axial opening 21 adapted for the insertion of shaft 24 of gage plunger 22. The gage gasket is made of any plastic or resilient material which does not affect the operation of the gage plunger but prevents dust or foreign particles from entering the inner region of the gage.

The gage spring 34 has 3 equidistant cap screw openings 35. In addition it has a horseshoe shaped leaf or reed 36 with a horseshoe shaped slot 37 concentric with axial opening 38. The horseshoe shaped leaf or reed 36 is adapted to be pivoted or bent on the outer portion 39 of the gage spring 34.

The gage spring 34 is made of any suitable material, such as spring steel or, as in the preferred embodiment, berylium copper. To assemble the sub-assembly 10, gage gasket 18 is placed against or on top of mounting plate 12. The gage plunger assembly 22 comprising the gage pole or capacitor plate 27 at one end of shaft 24 and the rounded tip portion 26 at the other end is inserted through axial opening 21 of gage gasket 18 and through axial bore 16 of mounting plate 12. As shown in FIG. 3, the gage tip portion extends separately beyond the termination of the threaded end portion 14. Abutting gage gasket 18 is gage spring 34 fastened to gage pole or capacitor plate 27. The gage pole or capacitor plate 27 is mounted on the leaf or reed 36 and is adapted to be pivoted or bent within the confines of slot 37 for the purpose of which will be hereinafter described. The gage pole spacer 32 is placed against the gage spring 34 and cap screw 40 is inserted through opening 33 of gage pole spacer 32, openings 35 of gage spring 34, openings 20 of gage gasket 18 and threaded into openings 15 of mounting plate 12. Thus the sub-assembly 10 is in the form of a unitary structure which is adapted to be handled separately and apart from the positive gage pole sub-assembly 50.

The positive pole gage sub-assembly 50 comprises a round portion of similar diameter to the sub-assembly 10. The positive gage pole sub-assembly 50 includes a knurled portion 51 on its outer diameter and further includes an axial bore 52 with internal threads 53. Adapted to be threadedly engaged on the sub-assembly 50 is a jack 54 having threads 55 engaging threads 53 to form a unitary structure. Included on the jack 54 are threads 56 for the purpose of connecting a coaxial cable thereto. Medially is a round smooth portion 57 of approximately similar diameter as threads 55 and terminating at a shoulder portion 58. On this round smooth portion 57 a metal washer 59 is placed against the shoulder 58 along with resilient washers 60 and 61. The purpose of using two resilient washers is to provide a sealable connection between the jack 54 and the face 62 of sub-assembly 50 when jack 54 is threaded in sub-assembly 50. A positive gage pole or plate 64 having a wire or some other conductive element 66 connected thereto is embedded or encapsulated in a dielectric or non-conductive insulating material such as epoxy 68. The wire, in the preferred embodiment, extends through the opening of the dielectric portion tip portion 70 and is formed, as by soldering, into a round terminal portion 72 which is adapted for connection to a coaxial cable. As seen in FIG. 3, the positive gage pole or plate 64 along with wire 66 and terminal portion 72 is insulated. As further noticed in FIG. 4, the positive gage pole or plate 64 has a face 65 which is in the same plane as the outer face portion of dielectric or epoxy 68 and the face 73 of sub-assembly 50. It is imperative that these faces be perfectly smooth and flat for the desired results necessary. This is done after the gage pole is embedded or encapsulated by epoxy and hardened. The sub-assembly 50 is then flat milled or sanded smooth by methods well known to anyone skilled in the art. It is imperative that the surface 30 of the other gage pole or plate 27 be finished ground or flat milled. As noted in FIG. 3, surfaces 65 and 30 of gage pole or plates 64 and 27, respectively, are separated by an air gap 74 as the performance of the gage is dependent upon absolutely flat surfaces of gage poles or plates 64 and 27. The complete gage is held together by cap screws 78 extending into cap screw openings 79 of sub-assembly 50, openings 80 of spacer 76, openings 81 of gage pole spacer 32, openings 82 of gage spring 34, openings 83 of gage gasket 18, and openings 84 of mounting plate 12.

As viewed in FIG. 3, any movement of plunger 24, such as rounded portion 26 contacting a workpiece, will cause movement of gage pole or plate 27 which is secured to leaf or reed 36 at a point 39 on gage spring 34. As an example the normal spacing between the surfaces of the gage pole or plates 27 and 64 may be of the order of five-thousandths of an inch, the minimum and maximum spacings representing departures therefrom equal to the expected variations in dimensions of the workpieces which are to be gaged. However, to provide for extended use of the gage, a gage spacer 76 is interposed between the two sub-assemblies 10 and 50. The gage spacer 76 is a shim and adapted to be of different thicknesses.

It will be further understood that variation in the gap as a result of changes in physical dimensions of a workpiece will cause movement of the capacitor plate 27 to the fixed capacitor plate 64 and thereby alter the frequency of an oscillator coupled to the jack 54 by a coaxial cable. The oscillatory network may be of any suitable conventional type, adapted to deliver energy at a suitable high frequency and shown in the above mentioned patents to M. M. Arlin, Nos. 2,635,748 issued Apr. 21, 1953, and 2,908,980 issued Oct. 20, 1959. The present system is primarily designed to produce a signal in response to changes in physical dimensions ranging in magnitude from a few thousandths of an inch down to one millionth of an inch.

The positive plate or pole piece 64 which forms a part of the gage, is connected to the anode of the system defined in the above mentioned patents. The other movable plate is the gage pole 27 which is directly grounded, in the cased through the frame of the gage. The plunger is connected to the movable plate or pole piece, during gaging, through a position in which it is parallel with the positioned plate to a position in which the plates are nonparallel. When, as herein disclosed, the gage head is associated with an electrical gaging circuit which produces an output direct voltage having a magnitude which tends to vary curvilinearly with changes in the capacitance of the gage head, the provision of the means for causing the movable plate to move, during gaging, from diverging to parallel to converging relationship with the other plate provides a compensating effect for the curvilinearity of the gaging circuit so as to provide improved rectilinearity between changes of the movable plate and the resultant changes in the output direct voltage.

Modification of the round gage poles will provide variations in the configuration such as shown in FIG. 5, in which the positive gage pole 64', is of quadrilateral configuration, embedded or encapsulated in a non-conductive dielectric, such as epoxy 68'. As disclosed hereinabove, a similar shim 76' provides the gage setting which is determined primarily by the size variations of the workpiece. The gage pole spacer 32' is of a similar width or thickness to that of the movable gage pole 27' which is, of course, in similar configuration to the positive gage pole 64'. As noted above the gage poles are flat milled or made perfectly smooth to provide a minimum of distortion in the gaging circuit.

In the preferred embodiment, the non-conducting material 68, shown in FIG. 3, extends from the surface plate end of the gage pole and into the axial bore portion of jack 54, however, in the modification shown in FIG. 5, the non-conducting material 68' is terminated at the threaded portion 53' of the gage sub-assembly 50'.

Only a limited number of preferred embodiments of the invention have been shown for illustration rather than limitation. It will be appreciated that various other modifications could be made, so that the invention is to be determined by the scope of the hereinafter appended claims.

What is claimed and is desired to be secured by United States Letters Patent is as follows:

1. A gage head for use in an electrical circuit means for producing a direct voltage output comprising:
    a cylindrical body separable into two portions along a longitudinal axis, consisting of a positive gage portion and a negative gage portion;
    (1) said positive gage portion comprising:
        (a) a cylindrical housing having at least one opened end and a closed end, said opened end forming a recess;
        (b) said closed end having an electrical connecting means;
        (c) insulating means extending through said electrical connecting means and filling said recess;
        (d) a gage pole forming a fixed capacitance plate embedded in said insulator means in said recess and having a flat planar surface normal to said axis and terminating in the same plane as the terminal end of said opened end of said cylindrical housing;
        (e) a wire extending through said insulating means and connecting said electrical connecting means to said gage pole;
        (f) said insulating means surrounding said gage pole and having the surface of said insulating means terminating in said plane of said gage pole and said opened end of said cylindrical housing;
    (2) said negative gage portion comprising:
        (a) a cylindrical gage mounting plate having a larger portion and a narrow threaded end portion, the circumference of said larger portion being in alignment with the circumference of said cylindrical housing of said positive gage portion; and having
        (b) a bore extending axially through said gage mounting plate;
        (c) a gage gasket mounted coaxially adjacent to said larger portion of said gage mounting plate;
        (d) a gage spring mounted coaxially adjacent to said gage gasket, said gage spring having a circular configuration coincident with said circular configuration of said gage head and including a slot of horseshoe configuration medially between said axis and said circumference and defining a central leaf portion whereby said central leaf portion of said gage spring is adapted to pivot;

(e) a gage pole forming a movable capacitance plate connected to said central leaf portion and adapted for pivotal movement therewith, the surface of said gage pole having a flat planar surface normal to said axis and in substantially parallel relationship to said fixed capacitance gage pole;

(f) a gage shaft extending axially through said bore of said negative gage portion having a bearing point at one end to be engageable with an object to be gaged and the other end connected to said movable capacitance gage pole, whereby linear movement of said gage shaft in response to variations in size of an object to be gaged causes movement of said movable capacitance gage pole toward said fixed capacitance gage pole;

(g) a gage pole spacer mounted adjacent to said gage spring and having the same thickness as said movable capacitance gage pole;

(h) means for fastening said gage pole spacer, said gage spring, said gage gasket and said gage mounting plate together to form a unitary sub-assembly structure;

(3) a shim interposed between said negative gage portion and said positive gage portion; and (4) means for securing said positive gage portion to said negative gage portion to form a unitary structure.

2. The combination of claim 1 whereby said shim means between said positive gage portion and said negative gage portion is adapted to provide a gap between said fixed capacitor pole and said movable capacitor pole whereby the capacitance between said poles is dependent on said gap and variations in sizes of objects to be gaged is provided therefor.

References Cited by the Examiner
UNITED STATES PATENTS

| | | | |
|---|---|---|---|
| 2,004,361 | 6/1935 | Arms et al. | 33—172 |
| 2,004,361 | 6/1935 | Arms et al. | 33—172 |
| 2,913,829 | 11/1959 | Arlin | 33—172 |
| 3,213,360 | 10/1965 | Cook et al. | 33—172 |

LEONARD FORMAN, *Primary Examiner.*

JOEL M. FREED, *Assistant Examiner.*